(12) United States Patent
Atieh

(10) Patent No.: US 6,404,541 B2
(45) Date of Patent: Jun. 11, 2002

(54) OPTICAL AMPLIFIER WITH ACTIVE-FIBER LOOP MIRROR

(75) Inventor: Ahmad Atieh, Nepean (CA)

(73) Assignee: Oprel Technologies Inc., Nepean (CA)

( * ) Notice: Subject to any disclaimer, the term of this patent is extended or adjusted under 35 U.S.C. 154(b) by 0 days.

(21) Appl. No.: 09/805,937

(22) Filed: Mar. 15, 2001

Related U.S. Application Data

(60) Provisional application No. 60/191,730, filed on Mar. 24, 2000, and provisional application No. 60/191,731, filed on Mar. 24, 2000.

(30) Foreign Application Priority Data

Mar. 24, 2000 (CA) ............................................. 2302097
Mar. 24, 2000 (CA) ............................................. 2302101

(51) Int. Cl.$^7$ ............................................. H01S 3/00
(52) U.S. Cl. ............................... 359/341.1; 359/333
(58) Field of Search ................... 359/333, 341.1

(56) References Cited

U.S. PATENT DOCUMENTS

| | | | |
|---|---|---|---|
| 4,839,898 A | 6/1989 | Payne et al. | 372/6 |
| 5,479,291 A | * 12/1995 | Smith et al. | 359/333 |
| 5,655,039 A | 8/1997 | Evans | 385/27 |
| 5,689,596 A | 11/1997 | Evans | 385/27 |
| 5,717,797 A | 2/1998 | Evans | 385/27 |
| 5,757,541 A | 5/1998 | Fidric | 359/341 |
| 5,999,545 A | * 12/1999 | Jeon et al. | 372/6 |
| 6,052,393 A | 4/2000 | Islam | 372/6 |
| 6,104,528 A | 8/2000 | Hwang | 359/341 |

FOREIGN PATENT DOCUMENTS

EP 0 635 739 A1 * 1/1995

OTHER PUBLICATIONS

"Loop-mirror filters based on saturable-gain or absorber gratings" Havstad et al., Optics Letters, vol. 24, No. 21, Nov. 1, 1999 pp 1466–1468.

* cited by examiner

Primary Examiner—Mark Hellner
(74) Attorney, Agent, or Firm—Neil Teitelbaum

(57) ABSTRACT

In optical amplifiers of the kind in which a so-called loop mirror is formed by connecting the ends of a loop of active optical fiber to a 3 dB coupler, improved signal-to-noise ratios are obtained by coupling pump energy into the loop without passing through the 3 dB coupler. The input signal and amplified output signal may be conveyed to and from the coupler by way of isolators connected to input and output ports of the amplifier. Alternatively, they may be conveyed by way of a circulator. Automatic gain control may be provided by means of a fiber grating, or other such wavelength-selective device, which reflects part of the amplified signal having a selected wavelength back into the loop, to provide lasing. The amount of energy so reflected may be controlled by an attenuator.

19 Claims, 3 Drawing Sheets

OPTICAL AMPLIFIER WITH ACTIVE-FIBER LOOP MIRROR

This application claims benefit of provisional applications Ser. No. 60/191,730 filed Mar. 24, 2000, and Ser. No. 60/191,731 filed Mar. 24, 2000.

TECHNICAL FIELD

This invention relates to optical amplifiers of the kind which have a so-called loop mirror formed by a loop of optical fiber with its ends connected to a 3 dB coupler. The invention is applicable especially, but not exclusively, to optical fiber amplifiers in which the loop mirror comprises a rare earth-doped fiber.

BACKGROUND ART

As explained in U.S. Pat. No. 5,757,541, which issued May 26, 1998 and named B. G. Fidric as inventor, optical amplifiers are known in which an optical signal to be amplified is passed through an active fiber together with pump energy from a separate source, such as a laser diode.

When discussing the prior art, Fidric explained that, whether the optical signal and the pump energy were both supplied to the same end of the active fiber, or to opposite ends of the active fiber, the known amplifiers exhibited non-uniform, non-symmetrical longitudinal pump excitation. Also, despite the use of isolators at the input and the output, backreflection resulted in a certain amount of pump energy reaching the input source.

Fidric proposed to overcome these problems by means of a loop mirror arrangement comprising an active fiber with its ends connected to two ports of a four-port 3 dB coupler. The input signal and pump energy supplied to the other two ports were split into two equal parts by the coupler and propagated simultaneously clockwise and counterclockwise around the loop. The input and output signals were applied to, and extracted from, the coupler by means of a circulator. The fiber was polarization-maintaining so that the states of the signals propagating through the loop mirror were maintained. Maintaining the polarization states was preferable to ensure that the amplified signal was not contaminated by the residual pump light. According to Fidric, this could be achieved, in the alternative, by means of a polarization controller in the fiber loop, but that is debatable.

The amplifier's noise figure and gain depend upon the extent to which the "forward" and "backward" ASE in the fiber are equal, so it is desirable for the 3-dB coupler to split both the pump energy and the input signal precisely into halves. Consequently, the coupler must be capable of providing the same 50—50 splitting over a range which includes both the pump energy wavelength and the input signal wavelength.

It is usual to pump an active fiber at different wavelengths, depending on the application. For example, when power output is the main consideration, a pump wavelength of 1480 nm is preferred. When noise is the main consideration, however, it is preferable to use a shorter wavelength, such as 980 nm, because the amplified spontaneous emission (ASE) produced by the active fiber is less at that wavelength. Fidric's proposed amplifier will not be entirely satisfactory when used with the shorter pump wavelength because, at present, a coupler capable of providing precise 50—50 splitting over a range from 980–1600 nanometers is not available. Even if pump energy with a wavelength of 1480 nm were used, the problem would persist, though to a lesser extent.

DISCLOSURE OF INVENTION

An object of a first aspect of the present invention is to eliminate or at least mitigate the above-described disadvantages and, to this end, there is provided an optical amplifier having a loop mirror comprising an active fiber and a coupler. Preferably, the pump energy is coupled into the fiber without passing through the coupler.

In one embodiment of the invention, an optical amplifier comprises a loop mirror in which a four-port 3 dB coupler has an active fiber connected between second and third ports, respectively, of the coupler, the coupler having a first port to receive an input signal for amplification, the output signal being provided at either the first port or a fourth port, and at least one pump means coupled between the coupler and the active fiber for injecting pump energy into the active fiber so as to copropagate therein with the input signal, the arrangement being such that the coupler will split the input signal into two equal parts which will propagate in opposite directions within the active fiber.

Preferably, two identical pump means are provided, adjacent respective ends of the active fiber, for injecting pump energy into the fiber in opposite directions, and the input signal and output signal are coupled to and from the first port by way of a circulator having its bidirectional port coupled to the first port. An advantage of using two identical pump means is that the "forward" and "backward" ASE in the active fiber can be equalized more readily. Alternatively, the amplifier may comprise a first isolator for coupling the input signal to the first port, a second isolator for coupling the output signal from the fourth port of the coupler, and a polarization controller in the loop, in series with the active fiber, for adjusting the polarization of the signal in the loop so that the output signal will appear at the fourth port.

The or each pump means may comprise a wavelength multiplexer and a pump energy source, such as a laser diode. A second aspect of the invention concerns automatic gain control in rare earth-doped fiber amplifiers. It is desirable to be able to maintain the amplifier gain at a constant value over a wide range of input powers. In an article entitled "Gain-clamped Fiber Amplifier with a Loop Mirror Configuration", IEEE Photonics Technology Letters, Vol. 11, No. 5, May 1999, Kyo Inoue explained that it is known to clamp the gain using optical feedback. According to Inoue, drawbacks of such gain-clamped amplifiers include the fact that they cannot be used for signals around the oscillation wavelength because such light enters the feedback loop and is not amplified efficiently, and laser oscillation light appearing at the output is an obstacle to system application.

Inoue proposed overcoming these drawbacks by means of a gain-clamped fiber amplifier in which the laser cavity is formed by a fiber grating and a loop mirror that comprises a loop of erbium-doped fiber connected to two ports of a 3 dB coupler. The grating and the pump energy are supplied to a third port of the coupler and the input signal is supplied by way of a circulator to a fourth port. The output signal is extracted via the circulator. According to Inoue, the signal light passes through the EDF without entering the laser cavity, even when its wavelength is close, or identical, to the oscillation wavelength.

This approach is not entirely satisfactory because it requires all of the components to be polarization-maintaining, which makes the amplifier complicated and expensive to manufacture. Another disadvantage is that available wavelength is limited because the wavelength of the fiber grating is within the useful wavelength of the amplifier.

According to the second aspect of the present invention, there is provided an optical amplifier comprising a loop mirror formed by a four-port 3 dB coupler and a length of active fiber having its ends connected to first and second ports, respectively, of the coupler, the coupler having a third port to receive an input signal for amplification, such that the coupler will split the input signal into two equal parts which will propagate in opposite directions within the active fiber, the output signal leaving the coupler via the third port, and at least one pump means coupled between the coupler and the active fiber for injecting pump energy into the fiber, further comprising means responsive to a portion of the amplified signal for reflecting into the loop mirror a selected wavelength that is outside a normal operating range of the input signal. An attenuator may be provided between the reflecting means and the coupler for adjusting the amount of the amplified signal reflected back into the loop mirror.

The reflecting means may comprise a grating, such as a fiber Bragg grating. Where the loop comprises an erbium-doped fiber, the selected wavelength may be, for example, 1525 nm. Because amplifiers embodying the present invention supply the pump energy directly in to the loop, i.e. without passing through the coupler, it is possible to use pump energy having a wavelength of 1480 nm for high power applications and 980 nm for applications requiring a low amplifier noise figure. The pump means may conveniently comprise a wavelength multiplexer connecting a pump energy source, for example a laser diode, to the loop.

In accordance with another embodiment of the invention there is provided an optical amplifier having a loop mirror including an active fiber and a coupler, optically coupled to a linear amplifying section. The linear amplifying section amplifies an input optical signal, while simultaneously producing amplified spontaneous emission that is used to further pump the amplified optical signal passing through the active fibre in the loop mirror.

BRIEF DESCRIPTION OF THE DRAWINGS

Embodiments of the various aspects of the invention will now be described by way of example only and with reference to the accompanying drawings, in which.

BEST MODE(S) FOR CARRYING OUT THE INVENTION

Figure 1:
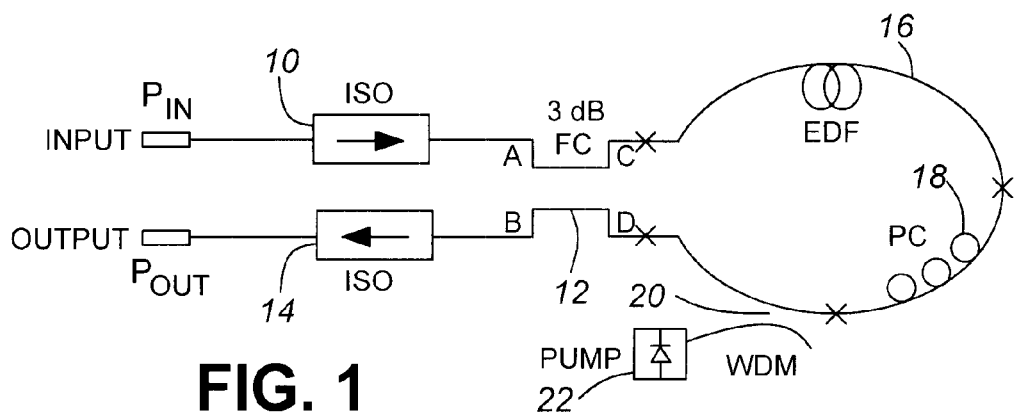
FIG. 1 is a simplified schematic diagram of a loop erbium-doped fiber amplifier having a pair of isolators at its input.

In the drawings, identical components appearing in different Figures have the same reference numbers.

Referring now to FIG. 1, an optical fiber amplifier comprises an input port $P_{IN}$ for receiving an optical signal to be amplified having a wavelength which, typically, will be in the range from 1525 nm to 1625 nm, i.e. the third telecommunication window, and an output port $P_{OUT}$ for outputting a corresponding amplified signal.

A first isolator 10 couples the input signal from port $P_{IN}$ to a port A of a fiber coupler 12, and a second isolator 14 couples the output signal from port B of the coupler 12 to amplifier output port $P_{OUT}$. A loop of active optical fiber, specifically an erbium-doped fiber (EDF) 16 is connected, in series with a polarization controller 18 and a wavelength-selective coupler 20, between ports C and D, respectively, of the coupler 12. The EDF 16 and the coupler 12 constitute a loop mirror. The coupler 12 is a 3 dB fiber coupler, which splits the signal at port A into two equal parts which appear at ports C and D, respectively, and propagate around the loop in opposite directions. The wavelength-selective coupler 20 couples into the loop mirror pump energy from a source 22. In this preferred embodiment, the pump source 22 is a laser diode which supplies pump energy having a wavelength of 980 nm.

Thus, in operation, the isolator 10 will pass the input signal from input port $P_{IN}$ to port A of the fiber coupler 12, which will split the signal into two equal parts. Each part will propagate around, and be amplified by, the loop mirror and return to ports C and D of the fiber coupler 12. The polarization controller 18 will be adjusted so that, when the counter-propagating signals arrive back at ports C and D, the phase difference between them is zero. Consequently, the coupler 12 will couple both parts, clockwise and counterclockwise, to exit via port B of the coupler 12 and isolator 14 will pass them to the output port $P_{OUT}$ of the amplifier. Meanwhile, the ASE will interfere destructively in the coupler 12 and, on average, only one half of the ASE will appear at the output port $P_{OUT}$.

Because the pump 22 is coupled directly into the loop mirror, the 3 dB coupler 12 does not have to be capable of accurately splitting both the input signal and the pump energy. Consequently, the wavelength of the pump energy can be 980 nm, which will result in less ASE being produced in the EDF 16, with a concomitant reduction in signal-to-noise ratio of the amplifier as compared with, for example, that disclosed in U.S. Pat. No. 5,757,541 which is constrained to using pump energy having a wavelength of about 1480 nm so as to avoid imbalance at the coupler 12.

Figure 2:
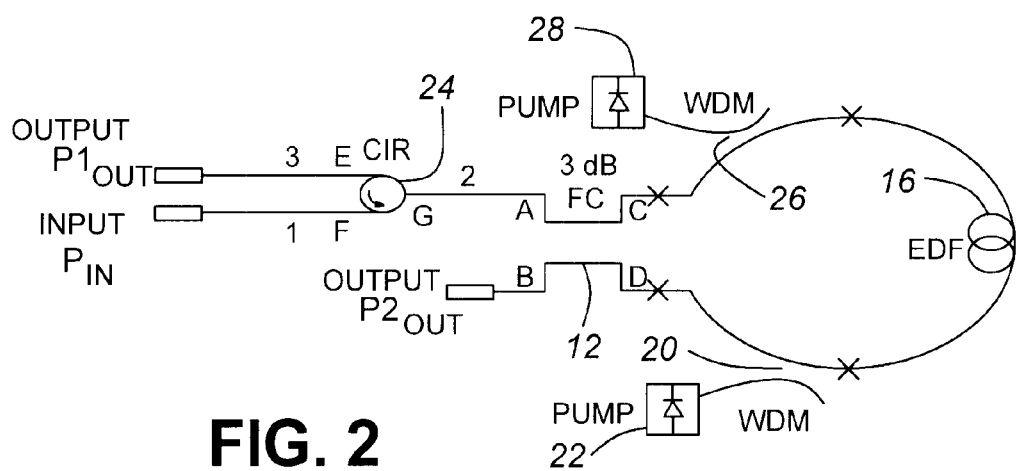
FIG. 2 is a simplified schematic diagram of a loop erbium-doped fiber amplifier having a circulator at its input.

It should be noted that the polarization controller 18 may be omitted and the isolators 10 and 14 replaced by a circulator. Also, if desired, two wavelength multiplexers may be used. Thus, the amplifier shown in FIG. 2 is similar to that shown in FIG. 1 in that it has a loop mirror formed by a coupler 12 and an EDF 16. It differs, however, in that, instead of isolators, it has a circulator 24 having a unidirectional input port F and a unidirectional output port E connected to the input port $P_{IN}$ and a first output port $P_{OUT}$, respectively, and a bidirectional port G connected to port A of the coupler 12.

The circulator 24 provides more than 45 dB isolation and 0.8 dB insertion loss between its ports. Port B of the coupler 12 is coupled to a secondary output port $P2_{OUT}$ of the amplifier. Also, a second wavelength-selective coupler 26 connected between one end of the EDF 16 and coupler port C injects into the loop energy from a second pump source 28. Both of the pump sources 22 and 28 supply pump energy with a wavelength of 980 nm. As before, in operation, the coupler 12 splits the input signal into two equal parts which propagate in opposite directions around the loop of erbium-doped fiber 16. The energy from the two pump sources 22 and 28 also propagates around the loop of fiber 16. An advantage of using two pumps 22 and 28 is that each will generate an equal amount of ASE which will improve the noise figure and gain. In either of the above-described amplifiers, while it is preferred to use a pump energy wavelength of 980 nm for low noise applications, as explained in the introduction, it is also possible to use a pump energy wavelength of 1480 nm. Both wavelengths are used in present day optical amplifiers.

Figure 3:
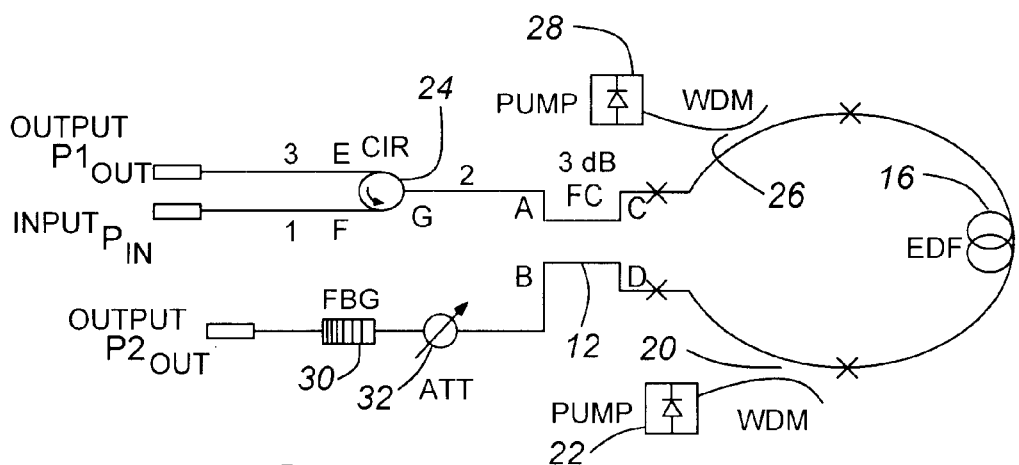
FIG. 3 is a simplified schematic diagram of a loop erbium-doped fiber amplifier with automatic gain control and which is a modification of the amplifier of FIG. 2.

FIG. 3 illustrates a modification of the amplifier shown in FIG. 2 to provide automatic gain control. As before, the amplifier shown in FIG. 3 comprises a loop mirror formed by a 3 dB fiber coupler 12 and an EDF 16, with the energy from pump sources 22 and 28 coupled into the loop by wavelength-selective couplers 20 and 26, respectively, and a circulator 24 whereby the input signal to be amplified is directed to port A of the coupler 12 and the amplified signal is directed from port B of the coupler 12 to primary output port $P2_{OUT}$ of the amplifier. In this case, however, a Bragg grating 30 and an attenuator 32 are interposed, in series, between port B of the coupler 12 and output port $P2_{OUT}$ of the amplifier.

In operation of the amplifier of FIG. 3, the input signal is amplified by the loop mirror as before and the amplified signal appears at port B as a reflected signal. One half of the ASE produced in the erbium-doped fibre (EDF) 16 will appear at port A of the coupler 12 and hence appear in the output signal coupled by the circulator 24 to output port $P1_{OUT}$. The other half of the ASE will appear at port B and be applied to the Bragg grating 30, which will reflect that part of the ASE which has the same wavelength as the grating. It should be noted that the ASE will have wavelengths ranging throughout and beyond the useful band of the input signal. Hence, it is possible to use a Bragg grating having a reflection wavelength outside the useful operating band of the EDFA, though it is desirable to avoid the wavelength commonly used for surveillance purposes. In the preferred embodiment, the Bragg grating has a reflection wavelength of 1525 nm.

The 1525 nm component of the ASE reflected to the coupler 12 by the Bragg grating 30 will pass into the loop again and be amplified. One half of the amplified reflected component will reappear at coupler port B, and be passed back to the Bragg grating 30. Consequently, lasing conditions exist between the reflecting Bragg grating 30 and the loop mirror which includes amplification by virtue of the EDF 16. The lasing is controlled by the attenuator 32 between the Bragg grating 30 and port B of the fibre coupler 12. Hence, adjusting the attenuator 32 adjusts the gain of the EDFA, i.e. the gain at which it is clamped.

Figure 4:
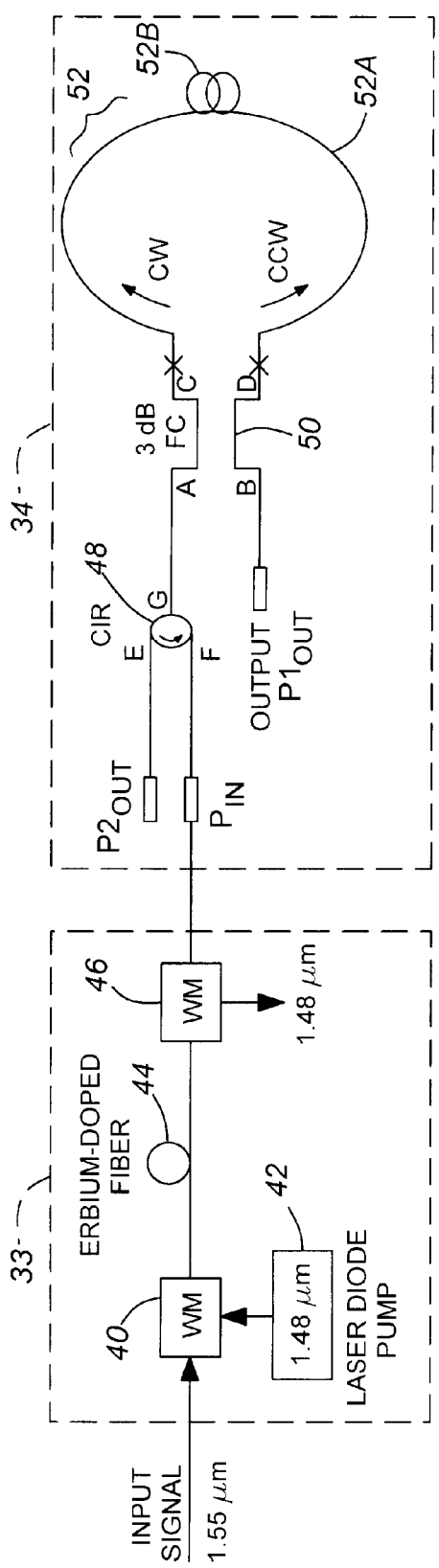
FIG. 4 is a simplified schematic diagram of an optical amplifier having an EDFA section and a loop mirror filter having an active section.

Referring to FIG. 4, there is shown an alternative embodiment comprising an optical amplifier including an erbium doped fiber amplifier (EDFA) section 33 and a loop mirror filter (LMF) 34, wherein the LMF 34 removes at least some of the amplified spontaneous emission (ASE) generated within the EDFA section 33.

The EDFA 33 comprises a first wavelength selective coupler 40, for combining the input signal with energy from a pump source 42 and applying it to one end of an erbium-doped fiber (EDF) 44. Within the EDF 44, pump energy is transferred to the input signal causing amplification in known manner. The other end of the EDF 44 is connected to a wavelength demultiplexer 46 which extracts residual pump energy and supplies the amplified signal to input port $P_{IN}$ of the LMF 34.

The LMF 34 comprises a circulator 48, a coupler 50 having four ports identified as A, B, C and D, and a loop of optical waveguide 52 connected between ports C and D of the coupler 50, which is preferably a 3-dB fiber coupler, such as a 1550 nm 3-dB fiber coupler. The loop of optical waveguide comprises an optical fiber 52A, such as that marketed as type SMF-28 by Corning Inc., and an active section, such as an erbium-doped fiber 52B. Typically, the total length of linear active fibre 52 is as short as possible to avoid polarization fluctuations. For example, the total length is typically on the order of 5 meters, and preferably is under 10 meters. Advantageously, the linear active fibre 52 is short relative to optical fibres used in non-linear loops, which for example, are in the order of hundreds of meters. The other two ports A and B of the coupler 50 are connected to a bi-directional port G of the circulator 48 and a first output port $P1_{OUT}$ of the LMF 34, respectively. The circulator 48 has a unidirectional input port F and a unidirectional output port E connected to the input port $P_{IN}$ and a second output port $P2_{OUT}$ respectively. Preferably, the circulator 48 has more than 45 dB isolation and 0.8 dB insertion loss between its ports.

Optionally, the performance of the optical amplifier 16 is enhanced, especially for low input signal power, by inserting an isolator (not shown) between the output of EDFA 33 and the input of LMF 34 to avoid or reduce Rayleigh backscattering.

In another embodiment, an improvement in overall noise figure is achieved by using polarization maintaining components including polarization-maintaining fiber. Additionally or alternatively, a polarization controller (not shown) and an inline polarizer are conveniently added between the circulator 48 and the coupler 50 to improve eliminating ASE from the signal. If a polarization controller is used, the EDFA need not use polarization-maintaining components or be constrained to provide a particular state of polarization.

In operation, the amplified optical signal leaving the circulator 48 via port G and entering port A of the coupler 50 is a coherent signal and has a certain phase. The coupler 50 splits the signal equally into 50 percent signals CW and CCW which leave the coupler 50 via its output ports C and D, respectively, so that they propagate in opposite directions around the loop of fiber 52. The signal CW propagating clockwise (as shown) in the loop 52 will be in phase with the signal at port A. The signal CCW leaving port D and propagating counterclockwise will be phase-shifted through $\pi/2$ radians relative to the clockwise signal CW. This phase difference is attributed to the fact that light coupled across a coupler undergoes a $\pi/2$ radian phase shift relative to light coupled straight through. When the CW and CCW signals arrive back at the opposite ports D and C, respectively, they pass through the fibre coupler 50 again to produce an output signal at port A substantially equal to the sum of the CW and the CCW signals and having a phase shift of $\pi/2$ radians relative to the input signal. In other words, since the CW and CCW components propagate through the same optical path, a relative phase shift therebetween is not produced. However, a phase shift of $\pi/2$ is observed between the input and output signals due to the presence of the coupler 50. This reflected output signal appearing at port A is a result of the interference within the coupler 50. It is directed from port A to port G of the circulator 48, where it is output via output port $P2_{OUT}$. In theory, there should be no output of the signal from output port $P1_{OUT}$ because the whole signal energy should be reflected in the loop mirror formed by fibre 52 and the coupler 50. In practice, there may be some slight leakage because the coupler 50 will not split at exactly 50 percent.

Similarly, the ASE noise that is generated by the EDFA 33, is split into 50 percent signals corresponding to CW and CCW components that propagating in opposite directions around the loop of the optical fibre 52 and appear at port A along with the reflected signal. However, when the amplified signal and ASE pass through the active fibre 52b in the linear active loop 52, the ASE is used to pump the amplified signal, thus effectively filtering out some of the ASE and simultaneously further amplifying the amplified signal. In other words, the presence of the active fibre within the linear loop results in energy transfer from the ASE to the optical signal, thus reducing the amount of ASE at the signal wavelength and simultaneously compensating for the LMF insertion loss i.e., the insertion loss resulting from the incorporation of the circulator 48 and coupler 50. The more ASE accompanying the amplified signal the more energy is transferred from the ASE to the signal. Since the amplifying section 33 generates more ASE for lower input power levels than higher, the instant invention is particularly useful for low power applications.

Advantageously, the presence of the erbium-doped fiber 52B reduces the amount of ASE at the signal wavelength and simultaneously increases the signal power to improve the signal-to-noise ratio. Of course, the erbium-doped section of the optical waveguide 52 could be replaced with another active section. For example, a fibre doped with another rare earth, or combination of rare earths, is also within the scope of the instant invention.

Figure 5:
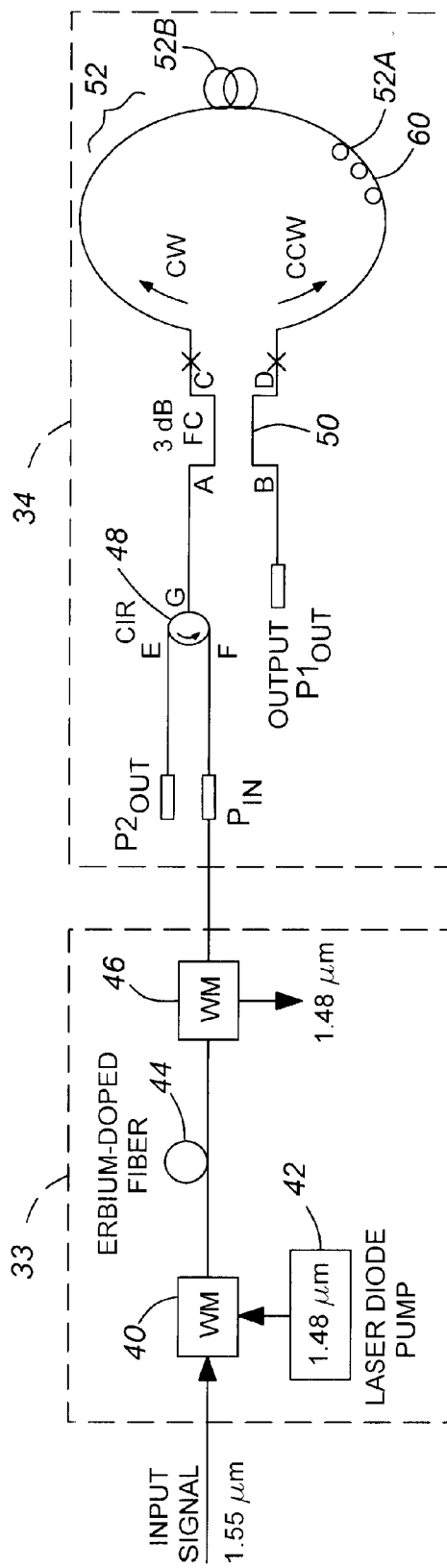
FIG. 5 illustrates an embodiment of the optical amplifier shown in FIG. 4 including a polarization controller disposed in the loop mirror.
Figure 6:
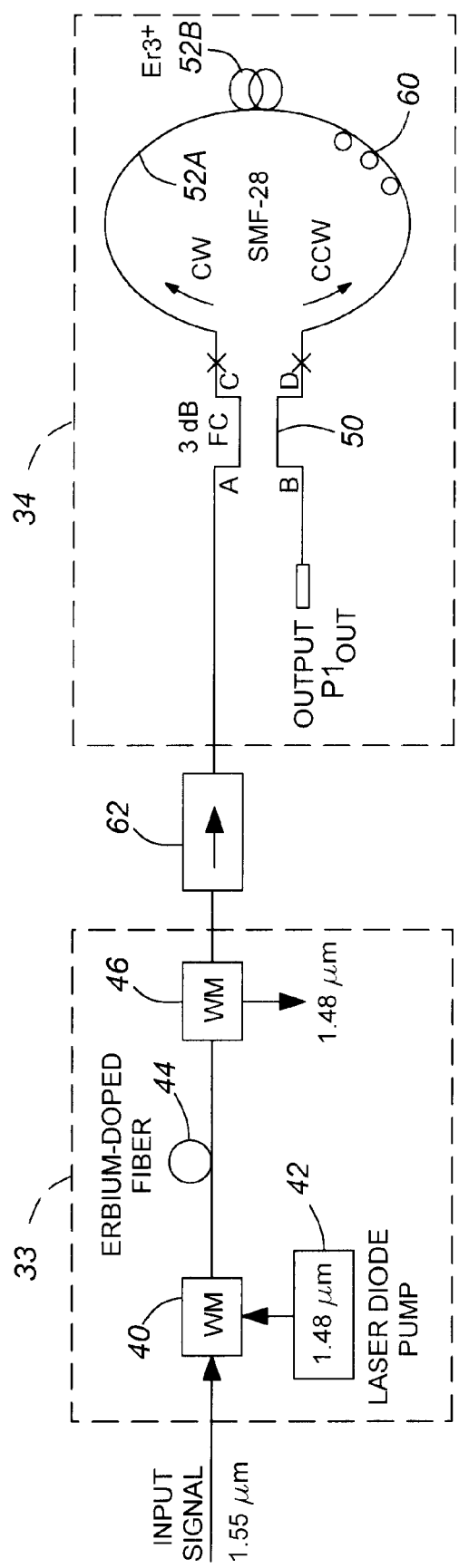
FIG. 6 illustrates yet another embodiment of the optical amplifier shown in FIG. 4.

Referring to FIG. 5, there is shown a preferred embodiment of the amplifier 16, wherein the linear LMF 34 includes a polarization controller 60. Preferably, the polarization controller 60 uses variable birefringence to control the power levels between $P1_{OUT}$ and $P2_{OUT}$ and/or to determine the amount of ASE filtering. For example, the polarization controller 60 could be adjusted to direct all of the amplified signal to the fourth port B of the coupler 50, to $P1_{OUT}$, or alternatively could be adjusted to tap some of the optical signal, say about 10%. In the former case, the circulator 48 could be replaced by an isolator 62, as shown in FIG. 6. A second isolator (not shown) might then be inserted between the coupler 50 and the output port $P1_{OUT}$ to prevent backreflected light into the EDFA, hence improving the noise figure. All other components are similar to the components described with respect to FIG. 4.

INDUSTRIAL APPLICABILITY

An advantage of embodiments of the invention, in which the pump energy is not supplied via the coupler 12, is that the coupler does not need to provide precise 50—50 splitting over as wide a range of wavelengths. Consequently, a conventional 3-dB coupler can be used. In addition, pumping directly into the loop avoids the need for expensive polarization-maintaining fiber. Consequently, the amplifiers may require less manufacturing time and be less costly than known loop mirror amplifiers while providing better technical performance.

An advantage of the amplifiers described with respect to FIG. 3, as compared with, for example, that disclosed by Inoue et al. is that it does not require a polarization-maintaining fiber, and other polarization-maintaining components, nevertheless any of the embodiments described above, the active fiber, 3 dB coupler, isolators/circulator, and wavelength-selective couplers could be polarization-maintaining so as to further reduce leakage of the amplified signal to the other output ports of the 3 dB coupler.

In amplifiers that embody the gain-controlling aspect of the invention, the wavelength of the fiber grating 30 is outside the useful spectrum of the amplifier, so the amplifier may be operated throughout its useful range.

An advantage of optical amplifiers including a loop mirror filter is that they work well with low power input signals, and yield improved signal-to-noise ratios.

What is claimed is:

1. An optical amplifier comprising an optical waveguide having an active section, an optical coupler having a first port for receiving an optical signal and second and third ports for coupling to the optical waveguide to provide an active linear loop mirror for increasing a signal-to-noise ratio of the optical signal, wherein pump energy is coupled into the active section without passing through the optical coupler.

2. An optical amplifier according to claim 1, wherein the optical coupler is a 3 dB coupler including a fourth port, and pump energy is provided by at least one pump means coupled between the coupler and the active section.

3. An optical amplifier according to claim 2, further comprising first and second isolators, the first isolator being coupled between the first port of the coupler and an input port of the amplifier, the second isolator being coupled between the fourth port of the coupler and an output port of the amplifier.

4. An optical amplifier according to claim 2, comprising a circulator having a bidirectional port connected to said first port of the coupler, and first and second unidirectional ports connected to, respectively, an input port and a second output port of the amplifier.

5. An optical amplifier according to claim 2, further comprising a reflection device connected to the fourth port of the coupler for reflecting energy having a particular wavelength that is outside a normal operating wavelength band of the amplifier into the loop mirror through the coupler.

6. An optical amplifier according to claim 5, further comprising means for controlling the amount of said energy reflected into the loop mirror.

7. An optical amplifier according to claim 5, wherein the reflection device comprises a fiber Bragg grating.

8. An optical amplifier according to claim 7, wherein the particular wavelength is about 1525 nm.

9. An optical amplifier according to claim 8, further comprising an attenuator between the Bragg grating and the coupler for adjusting a gain of the amplifier.

10. An optical amplifier according to claim 2, comprising two pump means for injecting pump energy having the same wavelength into the waveguide having an active section from opposite ends thereof.

11. An optical amplifier according to claim 2, comprising a polarization controller connected in series with the waveguide having an active section.

12. An optical amplifier according to claim 7, wherein the waveguide having an active section comprises an erbium-doped fiber.

13. An optical amplifier according to claim 12, wherein the waveguide having an active section comprises a linear optical waveguide for providing a linear loop mirror.

14. An optical amplifier comprising: a linear loop mirror comprising a 3 dB coupler and a length of active fiber having a first end and a second end connected to second and third ports, respectively, of the coupler, the coupler having a first port for receiving an input signal for amplification, the coupler for splitting the input signal into two equal parts for propagating in opposite directions within the active fiber, and for outputting an amplified output signal via the first port, and at least one pump means coupled between the coupler and the active fiber for injecting pump energy into the fiber.

15. An optical amplifier according to claim 14 further comprising reflection means responsive to a portion of the amplified signal for reflecting into the loop mirror a selected wavelength that is outside a normal operating range of the input signal.

16. An optical amplifier according to claim 15, comprising a circulator having a bidirectional port connected to said first port of the coupler, and first and second unidirectional ports connected to, respectively, an input port and a second output port of the amplifier.

17. An optical amplifier according to claim 16, further comprising an attenuator between the reflecting means and the coupler for adjusting an amount of the amplified signal reflected back into the loop mirror.

18. An optical amplifier according to claim 17, wherein the reflection device comprises a fiber Bragg grating.

19. An optical amplifier according to claim 18, wherein the active fiber comprises an erbium-doped fiber.

* * * * *